United States Patent [19]
Yuasa

[11] 4,440,489
[45] Apr. 3, 1984

[54] EXPOSURE AIDING DEVICE FOR AN ENLARGER

[75] Inventor: Yoshio Yuasa, Kawachinagano, Japan

[73] Assignee: Minolta Camera Kabushiki Kaisha, Osaka, Japan

[21] Appl. No.: 397,233

[22] Filed: Jul. 12, 1982

[30] Foreign Application Priority Data

Jul. 16, 1981 [JP] Japan .......................... 56-105641[U]

[51] Int. Cl.3 .............................................. G03B 27/70
[52] U.S. Cl. ...................................................... 355/69
[58] Field of Search ....................... 355/18, 20, 67–71, 355/77

[56] References Cited

U.S. PATENT DOCUMENTS 2,460,443 2/1949 Benton .................................. 355/69
3,989,374 11/1976 Latka et al. ....................... 355/67 X
4,025,190 5/1977 Hughes ................................ 355/68

FOREIGN PATENT DOCUMENTS 1593438 7/1981 United Kingdom .

OTHER PUBLICATIONS

"Photo Timer" from *Electronics Today International,* Sep. 1975.

*Primary Examiner*—Donald A. Griffin
*Attorney, Agent, or Firm*—Jackson, Jones & Price

[57] ABSTRACT

An exposure amount indicating arrangement for use with a photographic printing apparatus or the like, which includes an exposure amount setting section for setting values corresponding to desired printing exposure amount, an elapsed exposure amount output section for successively outputting values corresponding to elapsed exposure amount from starting of the printing, a calculating section for working out a ratio of the elapsed exposure amount to the set exposure amount, and an informing section for visually or acoustically indicating the ratio of the elapsed exposure amount to the set exposure amount, based on the value worked out by the calculating section.

10 Claims, 2 Drawing Figures

EXPOSURE AIDING DEVICE FOR AN ENLARGER

BACKGROUND OF THE INVENTION

1. Field of the Invention

The present invention generally relates to photography and more particularly to an exposure aiding device for an enlarger.

2. Description of the Prior Art

Conventionally, it is known as a method for obtaining a fine contrast print to differentiate the amount of exposure for a particular region from other part of a printed image: Such conventional method is classified into "shading" method and "spot printing" method. The shading method is defined as subjecting a part of a particular region to be printed with less exposure than other part to be printed suitably. On the contrary, the spot printing is defined as subjecting a part of a particular region to be printed with more exposure, i.e. overexposed than other part to be printed suitably.

Commonly, the ratio of exposure amount for a part which will be underprinted or overprinted to that for other part which will be printed normally, i.e. the shading amount or the exposure amount for the spot printing region and a normal exposure time have been determined according to a result of test printing, for example, of the normal exposure time and the shading amount, a normal exposure time of 10 sec. and a shading amount of 70%. The shading time is calculated by an operator such as 10 sec. $\times 0.7=7$ sec. However, if an aperture value of an enlarging lens or an enlarging magnification of said enlarger is changed, the normal exposure time must be changed accordingly, which causes to re-calculate the shading time. For example, if the normal exposure time is changed to 17 sec., the operator must work at a new shading time by a calculation of $17\times 0.7$. Therefore, it is required for the operator to re-calculate the shading time, every time the aperture value of the enlarging lens or the enlarging magnification of the enlarger is changed, which results in a complication of the printing work. It should be noticed that such complication by re-calculation is occurred not only in the case of using the shading method, but also in the case of using the spot printing method.

Furthermore, it is often used for obtaining a fine contrast print from a negative film to select the finest print among a plurality of prints which have been printed in accordance with a plurality of the exposure amount ratios preselected. In this case, it is also necessary to re-calculate the shading time or the spot printing time respecting each of the exposure amount ratios predetermined, which results in a complication of the printing work.

The article Phototimer appearing in Electronics Today International, of September 1975, and the British patent specification No. 1,593,438 are examples of prior art timers.

SUMMARY OF THE INVENTION

Accordingly, an object of the present invention is to provide an exposure aiding device for an enlarger, in which it is unnecessary to re-calculate the shading time or the spot printing time whenever the exposure amount ratio, the aperture value of the enlarging lens or the enlarging magnification is changed as described above.

Another object of the present invention is to provide an exposure aiding device of the above described type which is simple in construction and stable in functioning at high reliability, and can be readily incorporated into various photographic printing apparatuses at low cost.

In accomplishing these and other objects, according to the present invention, it is so arranged that an information corresponding to a ratio of an elapsed exposure amount from starting a printing process to a preset exposure amount is indicated with attention directed to the point that, even when the aperture value of an enlarging lens or the enlarging megnification is altered, the exposure amount ratio of a portion subjected to the shading or spot printing to other portion is not varied.

More specifically, according to one embodiment of the present invention, there is provided an exposure aiding device for use with an enlarger which includes an exposure amount setting section for setting values corresponding to desired printing exposure amount, an elapsed exposure amount output section for successively outputting values corresponding to elapsed exposure amount from starting of the printing, a calculating section for working out a ratio of the elapsed exposure amount to the set exposure amount, and an informing section for visually or acoustically informing an information relative to the ratio of the elapsed exposure amount to the set exposure amount, based on the value worked out by the calculating section.

By the above arrangement according to the present invention, an improved exposure aiding device for an enlarger has been advantageously presented, with substantial elimination of disadvnatages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
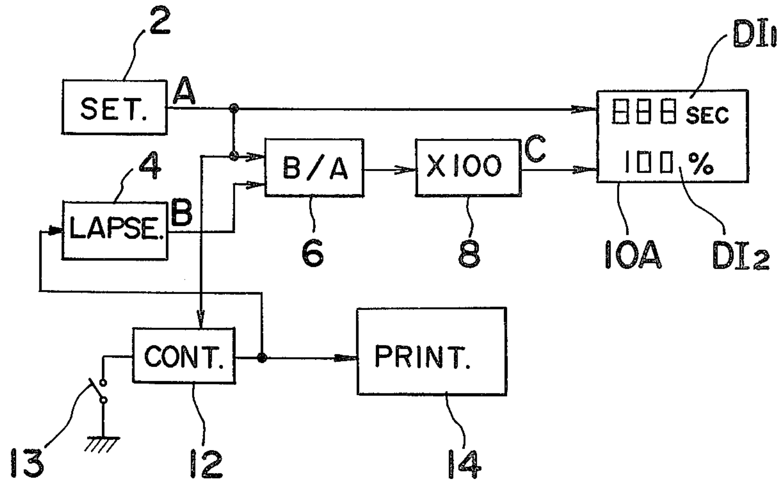
FIG. 1 is a block diagram showing a construction of an exposure aiding device of an enlarger according to one preferred embodiment of the present invention.

Before the description of the present invention proceeds, it is to be noted that like parts are designated by like reference numerals throughout the accompanying drawings.

Referring now to the drawings, there is shown in FIG. 1 a block diagram illustrating a general construction of an enlarger including an exposure aiding device according to one preferred embodiment of the present invention. The exposure aiding device of FIG. 1 generally includes an exposure time setting section 2 coupled with a display section 10A, an operating or calculating section formed by a dividing circuit 6 and a multiplier 8 connected to the display section 10A, and a control circuit 12 grounded through a printing switch 13 and connected to a known printing apparatus enlarger 14 having a flat light source such as a lamp (not shown) or the like, and an elapsed exposure time output section 4 connected to a junction between the control circuit 12 and the printing apparatus 14, and also to the deviding circuit 6.

In the exposure time setting section 2, a value A corresponding to the exposure time at a portion where a desired printing exposure time is required, for example, a long exposure time, has been preset, and the control circuit 12 is arranged to effect the printing exposure by actuating the known printing apparatus 14 according to closing of the printing switch 13. The elapsed exposure time output section 4 is controlled for its functioning by the control circuit 12 so as to successively output a value B corresponding to an elapsed exposure time from the starting of the printing. The calculating section including the dividing circuit 6 and the multiplier 8 is arranged to work out a ratio B/A the value B of the elapsed exposure time output section 4 to the value A set in the exposure time setting section 2 by the dividing circuit 6, and to multiply the result thus worked out by hundred at the multiplier 8 for outputting a value $C=(B/A)\times 100$ in percentage. Meanwhile, the display section 10A is provided with two display regions $DI_1$ and $DI_2$ arranged close to each other so as to display the value A set in the exposure time setting section 2 as it is in the digital form, and also to display the value C successively varying from 0% towards 100% according to lapse of printing processing in the digital values, respectively.

It is to be noted that the type for displaying the values A and C is not limited to the digital form as described above, but may have various forms, for example, such as that, with ten dot-like or bar-like light emitting display elements being arranged in one row for displaying the value C, the number of lighting indications is increased one by one for each increase of the value C by ten points, although such an arrangement is not particularly shown.

In case of practicing the shading method or the spot printing method by using the above arrangement, the exposure amount ratio N and the longest exposure time T1 for the normal exposure in the shading method or the exposure time for a part to be overprinted in the spot printing method are predetermined by suitable method such as test printing. The longest exposure time T1 is set in the exposure time setting section 2, which causes the display of the exposure time T1 in a display region $DI_1$ of the display section 10A, while the exposure amount ratio N is memorized by the operator. Subsequently, upon closing of the printing switch 13, the printing apparatus 14 is actuated by the control section 12 to start the printing. Simultaneously, the elapsed exposure time output section 4 starts time counting for applying time count value T2 thereof to the dividing circuit 6 every moment.

A value for $(T1/T2)\times 100$ obtained through the dividing circuit 6 and multiplier 8 of the calculating section , i.e. the ratio of the elapsed exposure time to the longest exposure time, is increased with the lapse of time, and is successively displayed in the other display region $DI_2$ of the display section 10A. In the above state, the operator, who has memorized the exposure amount ratio N, may carry out the desired printing by applying or removing a shade of a predetermined shape to or from the portion which is subjected to be underprinted in the shading method or not to be overprinted in the spot shading method when the value C displayed at the display region $DI_2$ becomes equal to the memorized exposure amount ratio N. Even if the aperture value of the enlarging lens or the enlarging magnification is altered, the operator effects the printing process in the similar manner as described above only by resetting the exposure time T1 in the exposure time setting section 2.

Figure 2:
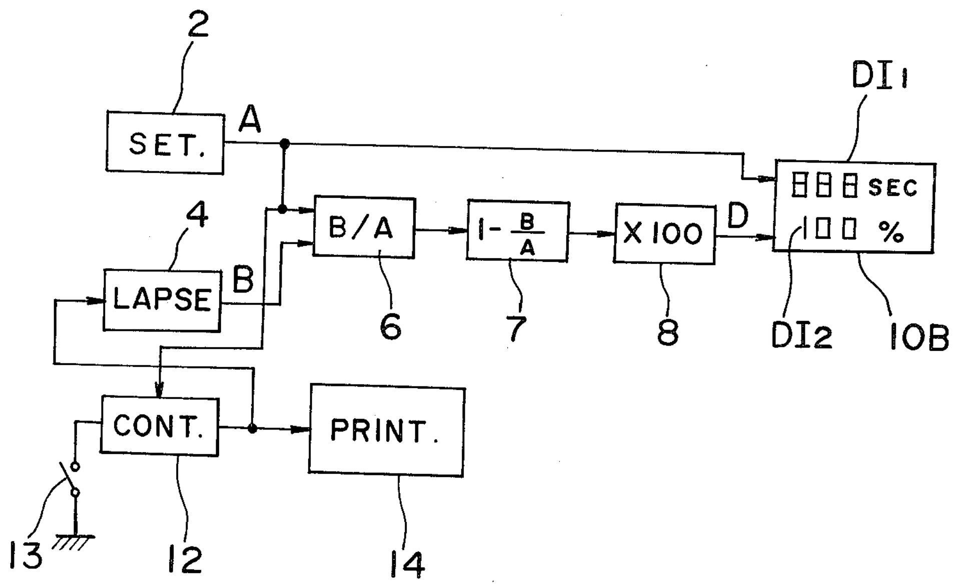
FIG. 2 is a block diagram similar to FIG. 1, which particularly shows a modification thereof.

Referring now to FIG. 2, there is shown a modification of the exposure aiding device of FIG. 1. The modified exposure aiding device of FIG. 2 further includes a subtracting circuit 7 inserted between the dividing circuit 6 and the multiplier 8 of the calculating section of FIG. 1, with the direct connection between the dividing circuit 6 and the multiplier 8 being removed, and is so arranged that, contrary to the embodiment of FIG. 1, the display for the exposure amount ratio varies from 100% towards 0%. It should be noted here that in the arrangement of FIG. 2, like components in FIG. 1 are designated by like reference numerals and symbols, with detailed description thereof being abbreviated here for brevity.

In FIG. 2, the subtracting circuit 7 inserted between the dividing circuit 6 and the multiplier 8 functions to work out a value for $$\left(1-\frac{B}{A}\right)$$

through subtraction of the value B/A produced from the dividing circuit 6. Therefore, a value $$D=\left(1-\frac{B}{A}\right)\times 100,$$

i.e a value obtained by multiplying the above result by hundred, is output from the multiplier 8. In the display section 10B, the value A set at the exposure time setting section 2 and the value D worked out in the above described manner are displayed in the respective display regions $DI_1$ and $DI_2$.

In the above arrangement, the case where the exposure amount ratio increases in accordance with the lapse of the printing time from 0% towards 100% as in the embodiment of FIG. 1 or the case where it decreases in accordance with the lapse of the printing time from 100% towards 0% as in the modification of FIG. 2, may be selected according to the choice of the operator or depending on which of the printing processings, i.e. the shading or spot printing is to be effected.

It should be noted here that, in the explanation of foregoing two embodiments, although the values with respect to the maximum exposure amount (the long exposure time) and the desired exposure amount ratio based thereon are set prior to starting the actual printing, it may be so modified that, with an average exposure amount being set, the printing processing is effected by the desired exposure amount ratio with respect to said average exposure amount, in which case, printing in a plurality of processes, for example, at 80% of shading and 150% of spot printing with respect to the average exposure amount can be readily effected. Alternatively, it may be so arranged that the spot printing is effected, with the desired minimum exposure amount being set.

It should also be noted here that, in the foregoing embodiments, although the description has been made with reference to the display section for visually indicating the exposure amount ratio, such a display section may be replaced by one for acoustically indicating the exposure amount ratio, for example, so arranged that a sound is produced from a piezoelectric buzzer or speaker every time the calculated value C or D varies by ten points for notification to the operator.

It should further be noted that, in the embodiments described so far, although the exposure time is employed as a value corresponding to the exposure amount, the arrangement may be so modified as to detect the amount of light received on the printing surface by taking into account a response delay etc. of the lamp during energization, and also that, for the printing apparatus, a light source having such a light emitting characteristic that the light amount thereof is successively increased with lapse of time, may be employed instead of the light source which emits a predetermined amount of light at all times.

As is clear from the foregoing description, according to the present invention, through utilization of the fact that the exposure amount ratio of the portion subjected to the shading or spot printing to the other portion remains constant, even upon alteration of the diaphram aperture of the enlarging lens value or the enlarging magnification, value corresponding to the actual exposure amount ratio varying through lapse of printing process are arranged to be displayed all the time, and therefore, the operator is only required to set the value corresponding to the desired exposure amount ratio, and to properly carry out the shading or spot printing, while watching the above display. Accordingly, the complicated procedures during the printing for re-calculating the exposure amount at the portions to be subjected to the shading or spot printing according to the variations in the diaphram aperture of the enlarging lens or the enlarging magnification as required in the conventional arrangements are not necessary in the arrangement of the present invention, with a consequent simplification of the printing work to a large extent.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An exposure aiding device for an enlarger comprising:

means for setting an exposure amount to output a setting signal corresponding to said set exposure amount, means for outputting successively an elapsed signal corresponding to an instantaneous amount of exposure accumulated from a start of printing process of said enlarger, means for calculating a value corresponding to a ratio of said elapsed exposure amount to said set exposure amount based on said setting signal and said elapsed signal to output a calculated signal indicating said calculated ratio, and means for informing an information relating to said calculated ratio based on said calculated ratio.

2. An exposure aiding device as claimed in claim 1, further comprising means for controlling a starting of a printing process and a starting of said elapsed signal outputting at the same time.

3. An exposure aiding device as claimed in claim 2, wherein said control means includes a switch for starting said printing process and starting said elapsed signal outputting at the same time.

4. An exposure aiding device as claimed in claim 1, wherein said calculating means is constructed so as to calculate a ratio of said elapsed exposure amount to said set exposure amount.

5. An exposure aiding device as claimed in claim 4, wherein said informing means is constructed so as to indicate a ratio of said elapsed exposure amount to said set exposure amount.

6. An exposure aiding device as claimed in claim 1, wherein said calculating means is constructed so as to calculate a ratio of a remaining exposure amount to said set exposure amount.

7. An exposure aiding device as claimed in claim 6, wherein said informing means is constructed so as to indicate a ratio of a remaining exposure amount to said set exposure amount.

8. An exposure aiding device as claimed in any one of claims 1 to 7, further comprising means for indicating said sėt exposure amount based on said setting signal.

9. An exposure aiding device as claimed in claim 8, wherein said indicating means and said informing means are arranged closely to each other.

10. An exposure aiding device as claimed in claim 1, wherein said exposure amount setting means is constructed so as to set an exposure time and said elapsed signal outputting means includes means for counting an elapsed time from starting said printing process to output an elapsed signal corresponding to said counted elapsed time.

* * * * *